United States Patent [19]

Higgins

[11] 3,942,998

[45] Mar. 9, 1976

[54] MOLYBDATE ORANGE PIGMENT WITH IMPROVED THERMAL STABILITY

[75] Inventor: James Francis Higgins, Livingston, N.J.

[73] Assignee: E. I. Du Pont de Nemours & Company, Wilmington, Del.

[22] Filed: Nov. 6, 1974

[21] Appl. No.: 521,523

[52] U.S. Cl. .............................. 106/298; 106/308 B
[51] Int. Cl.$^2$............................................ C09C 1/20
[58] Field of Search ........................ 106/298, 308 B

[56] References Cited
UNITED STATES PATENTS

| | | | |
|---|---|---|---|
| 2,808,339 | 10/1957 | Jackson | 106/298 |
| 3,370,971 | 2/1968 | Linton | 106/298 |
| 3,470,007 | 9/1969 | Linton | 106/298 |
| 3,639,133 | 2/1972 | Linton | 106/298 |

*Primary Examiner*—Patrick P. Garvin
*Assistant Examiner*—J. V. Howard

[57] ABSTRACT

Molybdate orange pigment treated with from 0.1 to 30% of a boron compound. The boron-treated molybdate orange pigments when coated with dense, amorphous silica are particularly useful for coloring high temperature molding plastics.

15 Claims, No Drawings

MOLYBDATE ORANGE PIGMENT WITH IMPROVED THERMAL STABILITY

BACKGROUND OF THE INVENTION

The term "molybdate orange" as used herein refers to the pigments identified by the Colour Index Number CI 77605 in the "Colour Index", second edition, 1956, published jointly by the Society of Dyers and Colourists, England, and the American Association of Textile Chemists and Colorists, United States. They range in color from a relatively light masstone, strong and yellow tint (small particle size) to a dark, red masstone and weak, red tint (relatively large particle size).

Molybdate orange pigments have been prepared by a variety of methods, most of which involve precipitation of molybdate orange pigment from aqueous solutions of its constituent ions, i.e., lead, molybdate, sulfate and chromate. Conventionally a solution containing soluble salts of molybdate, sulfate and chromate is mixed with a lead salt, in the form of an aqueous solution or a slurry depending on the solubility of the lead salt. After precipitation, but prior to isolation, the molybdate orange pigment is commonly treated with silica or alumina or both to provide a loose porous coating on the surface of the pigment to enhance pigmentary properties, such as lightfastness, in paint compositions, as describes, for example, in U.S. Pat. No. 2,813,039. The red shade molybdate orange pigments are conventionally further treated with an antimony compound, commonly antimony trichloride, after the treatment with silica and alumina but prior to isolation of the pigment. A widely used method which produces molybdate orange pigment of especially high strength is described in U.S. Pat. No. 3,567,477. According to the procedure of U.S. Pat. No. 3,567,477 molybdate orange is produced by jetting at high linear velocity a first aqueous salt solution containing soluble salts of molybdate, sulfate and chromate into a second aqueous solution containing a soluble lead salt, thereby precipitating the pigment, which is treated with silica and alumina in the conventional manner prior to isolation.

The major contribution toward color of molybdate orange pigment resides in the formation of a solid solution containing lead chromate. Likewise, many of their shortcomings are also attributable to the properties inherent in the lead chromate component. Among these are (1) sensitivity to alkalies and acids, (2) staining in the presence of sulfides and (3) darkening on exposure to light or to elevated temperatures.

Early attempts to overcome these deficiencies have usually involved special treatment of the pigments designed either to provide a means of neutralizing the attacking agent and rendering it temporarily ineffective or to provide a barrier against the ready access thereof to the sensitive pigment particle. The claimed improvements, although very frequently demonstrable, have usually been only of academic interest in that their effectiveness has been short lived and not of sufficient duration to render possible the use of these pigments in many applications, particularly those applications where a high degree of thermal stability is required.

More recent and relatively successful attempts to overcome these deficiencies are described, e.g., in U.S. Pat. Nos. 3,370,971 and 3,639,133. These patents describe coated lead chromate pigments, which are chemically resistant, lightfast and relatively thermally stable. The pigments therein described are prepared by applying a coating of dense, amorphous silica and optionally alumina to lead chromate pigment which has been precipitated and aftertreated with silica and alumina in a conventional manner. The dense silica-coated lead chromate pigments are described generally as resistant to darkening when heated to 300°C.–320°C. in such plastics as polyethylene or polystyrene. A dense silica-coated molybdate orange pigment is described in Example 1 of U.S. Pat. No. 3,370,391 as exhibiting no significant discoloration up to about 250° C. and minor discoloration up to 315°C. in a thermoplastic resin, compared to a conventional molybdate orange which darkens noticeably at 230°C.

Although the dense silica-coated lead chromate pigments do show significant improvement in thermal stability when compared with uncoated pigment and gel-coated pigment known in the art, the resistance to darkening exhibited by these pigments at 300°C.–320°C. is low enough under many processing conditions to necessitate the use of temperatures from 30°C.–60°C. lower than the stated range to insure adequate color integrity. The resistance to darkening is further decreased in proportion to the length of time the pigment is exposed to elevated temperatures. For example, a pigment which retains color integrity when initially reaching an elevated temperature can darken considerably after being maintained at that temperature for several minutes.

The need to avoid elevated temperatures and extended exposure to elevated temperatures has a particularly adverse impact on the thermoplastics industry. In the thermoplastics industry pigmented thermoplastics are often held at the extrusion temperature for as long as 30 minutes prior to extrustion, during which time the pigment can significantly darken. In addition, the speed of further processing depends primarily on high temperaturre of the thermoplastic. In the processing of thermoplastics the use of temperatures even 30°C. below 300°C., not to mention 60°C. below, can decrease polymer flow and increase residence time of the polymer in the mold to the extent that process efficiency suffers and overall productivity decreases.

This invention provides for boron-treated molybdate orange pigment which, when coated with dense, amorphous silica, retains a significantly higher degree of color integrity at high temperatures than conventional dense-silica-coated molybdate orange pigments, while retaining and, in some cases surpassing, the degree of chemical resistance and lightfastness exhibited by the conventional molybdate orange pigments.

SUMMARY OF THE INVENTION

According to the invention there is provided an improvement in a process for preparing molybdate orange pigment in aqueous medium by contacting an aqueous solution containing soluble salts of molybdate, sulfate and chromate with a salt of lead to form an aqueous slurry of said pigment and applying porous silica and alumina to the precipitated pigment. The improvement resides in adding from 0.1 to 30% by weight of a soluble boron compound, calculated as boric oxide, based on the weight of the final base pigment, to the aqueous medium. The phrase "final base pigment" as used herein refers to the boron-treated molybdate orange pigment with porous silica and alumina applied thereto. The boron compound utilized in this process is a water-soluble inorganic oxygen-containing boron compound which is capable of forming boric acid upon contact with aqueous media. For example, boric acid, boric oxide and acidified water-soluble borates, such as alkali metal borates in acidic solution, are useful in the process of the invention.

The boron compound can be added prior to precipitation of the molybdate orange pigment to partially replace the chromate or sulfate in the initial precipitate mixture or can be added at any time after precipitation of the pigment, i.e., prior to, during or after the application of porous silica and alumina to the precipitated pigment. The total amount of porous silica and alumina used in the practice of the invention is not critical. However, in common practice from 0.5 to 3.0% by weight of porous silica (calculated as $SiO_2$) and alumina (calculated as $Al_2O_3$), based on the weight of the final base pigment, is recommended to insure a coating which imparts the best pigmentary properties to the final base pigment.

To treat molybdate orange pigment prior to precipitation, it is preferred that the boron compound be added to the aqueous solution containing dissolved molybdate, sulfate and chromate to avoid any premature reaction with lead. When the boron compound is added prior to precipitation it is necessary to add only from 0.1 to 1% by weight of the boron compound, calculated as $B_2O_3$, to insure optimum properties in the final product. Amounts of boron compound greater than about 1% by weight are not recommended for use prior to precipitation as such larger amounts may alter the color of the pigment. Addition of the boron compound after precipitation requires from 1 to 30% by weight of the boron compound, calculated as $B_2O_3$, to insure desirable properties. Larger amounts of boron can be added after precipitation without adversely affecting product quality, but such excess amounts do not improve the product.

The boron-treated molybdate orange pigment of the invention contains porous silica and alumina, preferably in a total amount from 0.5 to 3.0% by weight, calculated as $SiO_2$ and $Al_2O_3$, respectively, and based on the weight of the final base pigment, and from 0.015 to 0.10% of boron, calculated as $B_2O_3$ and based on the weight of the final base pigment.

The boron-treated molybdate orange pigment of the invention is particularly useful as base pigment to which a coating of dense, amorphous silica and, optionally, alumina is applied according to procedures well-known in the art, e.g., U.S. Pat. No. 3,370,971. Although the pigments of the invention show at least comparable physical and chemical properties relative to untreated molybdate orange pigments, a significant improvement in chemical resistance and especially in thermal stability is exhibited when the pigments of the invention are coated with dense, amorphous silica. The coating of dense, amorphous silica is preferably applied in an amount from 2 to 40% by weight, calculated as $SiO_2$ and based on the total weight of the dense silica-coated pigment. Compared to conventional molybdate orange pigments coated with dense, amorphous silica, the boron-treated molybdate orange pigments of the invention coated with dense, amorphous silica show a marked improvement in color integrity at temperatures as high as 320°C.

DETAILED DESCRIPTION OF THE INVENTION

The aqueous medium from which molybdate orange pigment is precipitated should contain salts of molybdate, sulfate and chromate which are at least moderately soluble and preferably highly soluble in aqueous solution. For reasons of high solubility, economy and availability alkali metal salts, particularly sodium salts, of molybdate, chromate and sulfate are preferred. The lead salt is commonly added to the aqueous medium in the form of an aqueous solution or an aqueous slurry, depending on the solubility of the lead salt used. Although soluble lead salts are preferred to insure complete reaction, insoluble lead salts, such as lead carbonate, can be used to form molybdate orange pigment. Among the soluble lead salts useful in forming molybdate orange pigment are lead nitrate and lead acetate.

Because of the extremely low solubility of molybdate orange pigment in aqueous media, the pigment precipitates very rapidly from a solution of its constituent ions. To facilitate the formation of a complete solid solution of lead chromate, lead molybdate and lead sulfate, which constitutes pure molybdate orange pigment, it is desirable to mix an aqueous solution of molybdate, chromate and sulfate with a separate aqueous solution or slurry of lead salt. It is preferred that the mixing be done under conditions which promote rapid intimate contact of the two solutions, such as the mixing method described in U.S. Pat. No. 3,567,477, to minimize the amount of monoclinic lead chromate which precipitates with the desired solid solution.

The boron compound utilized in the process of the invention is most conveniently added to the aqueous medium in which the pigment is prepared in the form of an aqueous solution of the boron compound. A variety of soluble boron compounds are useful in this process, e.g., boric acid, boric oxide and acidified alkali metal borates. A major criterion for the boron compound, in addition to water-solubility, is that it be capable of forming boric acid in the aqueous solution in which the pigment is precipitated.

Whether the boron compound is added during or following precipitation of the pigment, it is essential that the pigment receive the conventional after-treatments with porous silica and alumina in order to achieve improved properties in the final pigment. No significant improvement in the properties of molybdate orange pigment is observed when the boron compound is employed alone, i.e., without application of coatings of porous silica and alumina.

It is not clear, at this time, exactly how the boron compound effects the improvements in porous silica and alumina coated molybdate orange pigment. Electron micrographs of the pigments of the invention indicate a substantially continuous coating on the molybdate orange pigment particles, compared to a noncontinuous coating on pigment particles, compared to a noncontinuous coating on pigment particles prepared without a boron compound. Whether the coating observed is composed of several layers or an intimate combination is not known. It is possible that a molecular monolayer of lead borate is formed on the molybdate orange pigment particles which improves the adhesion of the porous silica and alumina coatings applied after precipitation of the pigment. Although the role of the boron compound, which is at least partially in the form of boric acid in solution, in the compositions of the invention is not fully understood, it apparently by some mechanism facilitates the application of porous silica and alumina to the molybdate orange pigment, which when coated with dense, amorphous silica exhibits much improved thermal stability.

In any event, the after-treatment with porous silica and alumina which follows precipitation of the molybdate orange pigment can be applied in the conventional manner well-known to those skilled in the art, e.g., U.S. Pat. No. 2,813,039 and U.S. Pat. No. 3,567,477. The porous silica coating is commonly applied prior to isolation of the precipitated pigment by adding an aqueous solution of a soluble silicate compound capable of forming hydrous silica in water, e.g., sodium silicate. The alumina is applied by adding a soluble aluminum compound capable of forming hydrous alumina in water to the aqueous slurry of pigment. Among the aluminum compounds used are aluminum halides and hydrated aluminum sulfate, which may be added dry or in aqueous solution.

As stated hereinabove, the significant improvement in the thermal stability of the molybdate orange pigment of the invention is achieved when a coating of dense amorphous silica, and optionally alumina, is applied to the final base pigment. All of the known procedures for applying a dense silica coating to pigment involve using pigment which has been isolated from the aqueous slurry in which it was precipitated. The isolation procedure conventionally involves filtration, washing and, optionally, drying. For the boron-treated pigment prepared according to the invention, isolation prior to dense silica coating is preferred to achieve pigment having the highest thermal stability. The silica coating can be applied to the final base pigment in an amount from 2 to 40% by weight, based on the total weight of the dense silica-coated pigment, by a variety of conventional methods, such as described in U.S. Pat. Nos. 3,370,971 and 3,639,133.

In one method a dilute sodium silicate solution (about 3% by weight of $SiO_2$) is passed through a bed of cation exchange resin in the hydrogen form of sufficient capacity so that all of the sodium ion is removed to give a silicic acid effluent with a pH of 2.9–3.3. Such a solution is only moderaately stable, but will keep for several hours without gelation if maintained at a low temperature (close to 0°C.). A suitable amount of such a silicic acid solution is then added slowly (3–5 hours) to the alkaline pigment slurry at 90°–95°C. while maintaining the pH in the range of 9.0–9.5 by the periodic addition of increments of a dilute alkali such as NaOH solution. Obviously, the exact method of maintaining the pH in the desired range is not important and it could be done by maintaining the presence of a suitable buffer. Such a method would be subject, however, to the limitations imposed by the presence of sodium ion or other metallic ions, and the simple periodic addition of a suitable alkali has many points in its favor.

In another method equivalent amounts of a dilute sodium silicate solution (5.7% $SiO_2$) and a dilute sulfuric acid solution (3.18% $H_2SO_4$) are added simultaneously to the hot (± 95°C.) alkaline pigment slurry over a substantial period of time (3–5 hours) while maintaining the pH in the range of 9.0–10.0 by periodic addition of small amounts of dilute alkali (NaOH solution for instance). This is the preferred method of operation, and the variations mentioned earlier may easily be applied thereto. Thus, the pH may be allowed to go below 9.0, perhaps as low as 6.0 or 7.0, without completely destroying the desired effect; nevertheless, the results are better in the higher range. The reaction time can be reduced to as little as one hour without serious detriment. Although the temperature of reaction may be as low as about 60°C., this causes some tendency toward the formation of free $SiO_2$ in gel form; hence it is highly desirable to keep the temperature above at least 75°C. The exact concentrations of the solutions used are not important except that they should be relatively dilute and the amounts used should be essentially chemically equivalent.

A third method for applying a dense, amorphous silica coating to pigment involves adding all of the sodium silicate solution to the pigment slurry previously made alkaline, as with $NH_4OH$. This gives a pH of about 11.0, near the maximum permissible and, after heating the mixture to about 75°C., a 5% sulfuric acid solution is added slowly (1 to 1.5 hours) to give a final pH of about 7.8 to 8.0. An additional heating period up to about one hour is desirable in this procedure. The concentrations used and time of addition are not critical.

In each of these methods, the dense silica-coated product can be highly dispersed and difficult to filter with a considerable tendency for yield loss during the filtration and a tendency to result in hard products on drying. It is preferable, therefore, that a flocculation step be introduced. Such a step, although not necessary to the preparation of pigments of the desired characteristics, offers many advantages such as improved ease of filtration and washing, elimination of yield losses during filtration and improved texture of the resulting pigment. A variety of methods known in the art, such as those described in U.S. Pat. No. 3,370,971 are useful in isolating the dense silica-coated boron-treated pigment of this invention. A preferred method for facilitating isolation of the product is to add a polyvalent metal salt, especially an aluminum salt such as sodium aluminate, in aqueous solution, to the slurry of dense silica-coated pigment prior to isolation.

These methods of forming the silica layer on the surface of the lead chromate pigment particles have some feature in common, viz. that the silica is added as "active silica". When sodium silicate is acidified, silicic acid is formed, probably initially as orthosilicic acid, $Si(OH)_4$. However, this product tends to polymerize the reaction of two silanol groups.

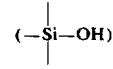

to form a siloxane group

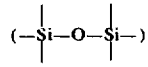

Under acidic conditions, this polymerization proceeds rapidly until a predominant proportion of the silanol groups present have been used up in the formation of siloxane bonds. The polymer thus formed has a high molecular weight and is defined as inactive. Under the conditions of moderate alkalinity used in the examples below, there is a low degree of polymerization wherein the condensation between silanol groups has proceeded to only a limited extent leaving the silica in an active form which readily deposits on the surface of the pigment particles present. It is not intended to imply that there is no polymerization nor that the process of polymerization is completely inhibited but, under the conditions specified, the silica is in a state of low polymerization and, thus active, for a sufficient time to bring about deposition in the dense, amorphous form on the surface of the pigment particles.

The quantity of silica to be applied in the pigment coating can vary over a considerable range depending on the intended end use of the pigment. For use in extruded hot thermoplastic resins from 15 to 32% by weight of silica is desirable, and amounts up to about 40% by weight can be used without adversely affecting pigment color. In applications where extremely high thermal stability is not required, amounts of silica as low as 2% by weight provide improved chemical resistance and lightfastness. Thus, for purposes of this invention the dense, amorphous silica coating can be in the range of about 2 to 40% by weight of the final dense silica-coated pigment. When alumina is also present the quantity of $Al_2O_3$ can be varied from 0.25 to 2% by weight of the final pigment.

PREFERRED EMBODIMENTS

In one embodiment of the invention boron-treated molybdate orange pigment is prepared by contacting a first aqueous solution containing a mixture of dissolved sodium salts of chromate, molybdate and sulfate at a pH from 7 to 9.5 with a second aqueous solution containing dissolved lead nitrate at a pH from about 3 to 4 to precipitate the pigment. The resulting pigment slurry is stirred for several minutes to facilitate crystal growth, commonly known as development, after which the slurry is neutralized. After neutralization an aqueous solution of boric oxide is added to the slurry. The amount of boric oxide added is from 1 to 30% by weight on a dry basis, based on the weight of the final base pigment. Then separate aqueous solutions of sodium silicate and hydrated aluminum sulfate, respectively, are added sequentially to the reaction slurry. The pH of the slurry is adjusted to from about 5.5 to 6.5. The boron-treated molybdate orange pigment is isolated from the slurry by filtration, washed with water and dried.

In another embodiment of the invention, boron-treated molybdate orange pigment is prepared by contacting an aqueous lead nitrate solution as described above with an aqueous solution containing in addition to the sodium salts listed above from 0.1 to 1% by weight of boric oxide on a dry basis, based on the weight of the final base pigment. The resulting pigment slurry is treated with silica and alumina and the final product is isolated as described above.

The following examples are intended to illustrate the invention. The term parts as used herein refers to parts by weight. The physical and chemical properties of all exemplified pigments are determined according to the procedures described in Example 1.

EXAMPLE 1

Red Shade Molybdate Orange Treated with 4.0% Boric Oxide After Precipitation

Solution A is prepared by dissolving 386.2 parts of $Pb(NO_3)_2$ in 3160 parts of wate and the pH is adjusted to 3.0–3.1 at a temperature of 67°F.–69°F. (19°C.–21°C.). Solution B is prepared by dissolving 146.1 parts of $Na_2Cr_2O_7.2H_2O$, 22.4 parts of $Na_2MoO_4$ and 7.2 parts of $Na_2SO_4$ in 3103 parts of water, and the pH is adjusted to 7.4–7.6 at a temperature of 67°F.–69°F. (19°C.–21°C.). To precipitate the pigment, Solution B is introduced under the surface of Solution A over a period of 17–19 minutes with agitation. Chloride ion concentration is adjusted to develop tint and strength in the conventional manner by adding 57.0 parts of NaCl, after which the slurry is stirred for 15 minutes. Then an aqueous solution containing 16.0 parts of $B_2O_3$ (4.0% by weight, based on weight of final base pigment) is added to the slurry and stirring is continued for three minutes. Porous silica is then applied to the pigment by adding 18.3 parts of sodium silicate (29.5% of $SiO_2$, $SiO_2/-Na_2O = 3.25$, such as Du Pont Technical Grade No. 9). Then an aqueous solution containing 28.5 parts of hydrated aluminum sulfate (equivalent to 56.1% of $Al_2(SO_4)_3$ or 17.1% of $Al_2O_3$) is added to the slurry. The slurry is then neutralized by adding 19.0 parts of sodium carbonate. After a few minutes of additional stirring, 5.2 parts of antimony oxide dissolved in hydrochloric acid is added to the slurry, after which the pH of the slurry is adjusted to 5.8–6.0. The resulting brilliant red shade molybdate orange pigment is isolated from the slurry in the conventional manner by filtration, washing and drying.

Electron micrographs of the boron-treated molybdate orange pigment show a substantially continuous outer coating. Electron micrographs of a conventional molybdate orange prepared in the identical manner, except for the omission of the boric oxide, show a discontinuous coating.

When the boron-treated molybdate orange pigment and the conventional molybdate orange pigment are separately dispersed in a conventional alkyd coating composition vehicle and panels coated with the resulting composition are exposed to light, a similar degree of lightfastness is observed. When similar panels are exposed to a 10% aqueous solution of sodium hydroxide and a 1% aqueous solution of sodium sulfide, respectively, the boron-treated molybdate orange pigment and the conventional molybdate orange pigment exhibit comparable resistance to spotting and color loss.

To test for resistance to darkening in thermoplastic at high temperatures the boron-treated molybdate orange pigment and the conventional molybdate orange pigment are separately mixed with solid granular polystyrene and subjected to can rolling for ten minutes, according to the method described in U.S. Pat. No. 3,639,133, then two-roll milled (0.016 inch clearance) into sheets. The sheets are cut and placed in an extruder at temperatures ranging from 204°C. to about 320°C. Prior to extrusion the hot polystyrene is maintained at temperature for 20 minutes. When the polystyrene is extruded, the polystyrene containing the boron-treated molybdate orange shows resistance to darkening from 204°C. to about 320°C. similar to the polystyrene containing the conventional molybdate orange pigment.

EXAMPLE 2

Dense Silica-Coated Red Shade Molybdate Orange Treated with 4% Boric Oxide After Precipitation A paste is prepared by mixing 150 parts of the boron-treated pigment prepared according to the procedure of Example 1, 20 parts of the sodium silicate described in Example 1 and 447 parts of water. The mixture is further diluted with 790 parts of water for a total of about 1237 parts of water. The pH of the resulting slurry is then adjusted to 11.5 with a 5% aqueous solution of sodium hydroxide and the resulting pigment slurry is heated to 90°C.

In separate containers the following solutions are prepared:

1. 115 parts of the above-described sodium silicate is added to 530 parts of water,
2. 17.3 parts of 96.0% sulfuric acid is added to 800 parts of water.

These solutions are then added simultaneously to the pigment slurry prepared above over a period of three hours for solution (1) and 3-¾ hours for solution (2), while maintaining the temperature at 90°–95°C. throughout the addition. After completion of the addition of solutions (1) and (2), an aqueous solution containing 10.0 parts of aluminum sulfate in 100 parts of water is added to the slurry. The slurry is stirred for five minutes and the pH is adjusted to 4.0–4.2 with 5% aqueous solution of sodium hydroxide. The product is then filtered, washed with water to a resistance of 5,000 ohms and dried overnight at 220°F. (100.4°C.) to give a silica-coated red shade molybdate orange pigment of superior properties.

When tested for lightfastness and chemical resistance in the manner described in Example 1, the dense silica-coated molybdate orange treated with boric oxide shows comparable lightfastness but improved chemical resistance relative to a conventional dense silica-coated molybdate orange pigment prepared in the identical manner, except for the omission of the boric oxide.

When mixed with polystyrene and extruded at high temperatures in the manner described in Example 1, the polystyrene containing the dense silica-coated molybdate orange pigment treated with boron shows substantially no darkening at temperatures up to about 280°C. and only very slight darkening at 320°C. By comparison the polystyrene containing the conventional dense silica-coated molybdate orange pigment begins to darken at 280°C. and exhibits significant darkening at 320°C.

EXAMPLE 3

Red Shade Molybdate Orange Treated with 8% Boric Oxide After Precipitation

The procedure of Example 1 is followed, except that 32.0 parts of boric oxide (8% by weight, based on weight of the final base pigment) is used.

Lightfastness, chemical resistance and thermal stability of the resulting pigment are similar to those of the boron-treated pigment described in Example 1.

EXAMPLE 4

Dense Silica-Coated Red Shade Molybdate Orange Treated with 8% Boric Oxide After Precipitation The procedure of Example 2 is followed, except that 150 parts of the molybdate orange pigment of Example 3 is used.

Lightfastness, chemical resistance and thermal stability of the resulting dense silica-coated pigment are similar to those of the boron-treated dense silica-coated pigment described in Example 2.

EXAMPLE 5

Red Shade Molybdate Orange Treated with 1% Boric Oxide After Precipitation

The procedure of Example 1 is followed, except that 4.0 parts of boric oxide (1% by weight, based on weight of final base pigment) is used.

Lightfastness, chemical resistance and thermal stability of the resulting pigment are similar to those of the boron-treated pigment described in Example 1.

EXAMPLE 6

Dense Silica-Coated Red Shade Molybdate Orange Treated with 1% Boric Oxide After Precipitation The procedure of Example 2 is followed, except 150 parts of the molybdate orange pigment of Example 5 is used.

Lightfastness, chemical resistance and thermal stability of the resulting dense silica-coated pigment are similar to those of the boron-treated dense silica-coated pigment described in Example 2.

EXAMPLE 7

Yellow Shade Molybdate Orange Treated with 10% Boric Oxide After Precipitation

Solution A is prepared by dissolving 349.6 parts of $Pb(NO_3)_2$ in 3174 parts of water and the pH is adjusted to 4.0–4.1 at a temperature of 67°F.–69°F. (19°C.–21°C.). Solution B is prepared by dissolving 132.25 parts of $Na_2Cr_2O_7.2H_2O$, 3.7 parts of $Na_2SO_4$ and 22.3 parts of $Na_2MoO_4$ in 3174 parts of water, and the pH is adjusted to 9.0–9.4 at a temperature of 67°F.–69°F. (19°C.–21°C.).

To precipitate the pigment, Solution B is introduced under the surface of Solution A over a period of several minutes. Then 2.51 parts of hydrochloric acid and 28.0 parts of sodium chloride is added to the resulting slurry. After stirring the slurry for 15 minutes, 10.35 parts of sodium carbonate is added to neutralize the slurry. Then an aqueous solution containing 34.0 parts of boric oxide (10% by weight, based on the weight of the final base pigment) is added to the slurry and stirred for three minutes. Porous silica is then applied to the pigment by adding 20.7 parts of the sodium silicate described in Example 1. Then 25.3 parts of the hydrated aluminum sulfate described in Example 1 is added to the slurry, and the pH is adjusted to 5.8–6.0.

A brilliant yellow shade molybdate orange is isolated from the slurry by filtration, washing and drying. Chemical resistance and thermal stability of this pigment are similar to those of the red shade molybdate orange pigment treated with boric oxide described in Example 1. The color and lightfastness of this pigment are comparable to a conventional molybdate orange pigment, prepared as described above except that the addition of boric oxide is omitted.

EXAMPLE 8

Dense Silica-Coated Yellow Shade Molybdate Orange Treated with 10% Boric Oxide After Precipitation The procedure of Example 2 is followed, except that 150 parts of the yellow shade molybdate orange pigment of Example 7 is used.

The chemical resistance and thermal stability of the resulting dense silica-coated pigment are similar to those of the boron-treated dense silica-coated pigment described in Example 2.

EXAMPLE 9

Yellow Shade Molybdate Orange Treated with 5% Boric Oxide After Precipitation

The procedure of Example 7 is followed, except that 17.5 parts of boric oxide (5% by weight, based on weight of final base pigment) is used.

The chemical resistance and thermal stability of the resulting yellow shade molybdate orange pigment are similar to those of the boron-treated pigment described in Example 1.

EXAMPLE 10

Dense Silica-Coated Yellow Shade Molybdate Orange Treated with 5% Boric Oxide After Precipitation The procedure of Example 2 is followed, except that 150 parts of the yellow shade molybdate orange pigment of Example 9 is used.

The chemical resistance and thermal stability of the resulting dense silica-coated pigment are similar to those of the boron-treated dense silica-coated pigment described in Example 2.

EXAMPLE 11

Yellow Shade Molybdate Orange Treated with 20% Boric Oxide After Precipitation

The procedure of Example 7 is followed, except that 68.0 parts of boric oxide (20% by weight, based on weight of final base pigment) is used.

The chemical resistance and thermal stability of the resulting yellow shade molybdate orange pigment are similar to those of the boron-treated pigment described in Example 1.

EXAMPLE 12

Dense Silica-Coated Yellow Shade Molybdate Orange Treated with 20% Boric Oxide After Precipitation The procedure of Example 2 is followed, except that 150 parts of the yellow shade molybdate orange pigment of Example 11 is used.

The chemical resistance and thermal stability of the resulting dense silica-coated pigment are similar to those of the boron-treated dense silica-coated pigment described in Example 2.

EXAMPLE 13

Red Shade Molybdate Orange Treated with 0.4% Boric Oxide before Precipitation

Solution A is prepared as described in Example 1. Solution B is prepared by dissolving 142.8 parts of $Na_2Cr_2O_7.2H_2O$, 7.16 parts of $Na_2SO_4$, 22.4 parts of $Na_2MoO_4$ and 1.56 parts of $B_2O_3$ (0.4% by weight, based on weight of final base pigment) in 3103 parts of water and the pH is adjusted to 7.4 at a temperature of 67°F.–69°F. (19°C.–21°C.).

To precipitate the pigment, Solution B is introduced under the surface of Solution A over a period of 17–19 minutes with agitation. Then 57.0 parts of NaCl is added followed by stirring for 15 minutes. The resulting slurry is then neutralized by adding 11.4 parts of sodium carbonate. After a few minutes of additional stirring, porous silica is applied to the pigment by adding 18.4 parts of the sodium silicate described in Example 1.

After stirring for three minutes 28.5 parts of the hydrated aluminum sulfate described in Example 1 is added to the slurry. Then an aqueous solution containing 19.0 parts of sodium carbonate is added to the slurry. After a few minutes of additional stirring the pigment is treated with antimony trichloride as described in Example 1.

The resulting brilliant red shade molybdate orange pigment is isolated in the conventional manner by filtration, washing and drying. Upon analysis and evaluation as described in Example 1, this pigment is found to have chemical resistance and thermal stability similar to the molybdate orange pigment treated with boric oxide after precipitation described in Example 1.

EXAMPLE 14

Dense Silica-Coated Red Shade Molybdate Orange Treated with 0.4% Boric Oxide before Precipitation The procedure of Example 2 is followed, except that 150 parts of the molybdate orange pigment of Example 13 is used.

The chemical resistance and thermal stability of the resulting dense silica-coated pigment are similar to those of the dense silica-coated pigment treated with boric oxide after precipitation described in Example 2.

EXAMPLE 15

Red Shade Molybdate Orange Treated with 0.4% Boric Oxide before Precipitation

The procedure of Example 13 is followed, except that 4.1 parts of $Na_2SO_4$ and 146.16 parts of $Na_2Cr_2O_7.2H_2O$ are used in Solution B.

The chemical resistance and thermal stability of the resulting pigment are similar to those of the boron-treated pigment described in Example 1.

EXAMPLE 16

Dense Silica-Coated Red Shade Molybdate Orange Treated with 0.4% Boric Oxide before Precipitation The procedure of Example 2 is followed, except that 150 parts of the molybdate orange pigment of Example 15 is used.

The chemical resistance and thermal stability of the resulting dense silica-coated pigment are similar to those of the dense silica-coated pigment treated with boric oxide after precipitation described in Example 2.

EXAMPLE 17

Red Shade Molybdate Orange Treated with 0.4% Boric Oxide before Precipitation

The procedure of Example 13 is followed, except that 146.16 parts of $Na_2Cr_2O_7.2H_2O$, 16.9 parts of $Na_2MoO_4$ and 7.16 parts of $Na_2SO_4$ are used in Solution B.

The chemical resistance and thermal stability of the resulting pigment are similar to those described for the boron-treated pigment of Example 1.

EXAMPLE 18

Dense Silica-Coated Red Shade Molybdate Orange Treated with 0.4% Boric Oxide before Precipitation The procedure of Example 2 is followed, except that 150 parts of the molybdate orange pigment of Example 17 is used.

The chemical resistance and thermal stability of the resulting dense silica-coated pigment are similar to those of the dense silica-coated pigment treated with boric oxide after precipitation described in Example 2.

What is claimed is:

1. In a process for preparing molybdate orange pigment in aqueous medium by contacting an aqueous solution containing soluble salts of molybdate, sulfate and chromate with a salt of lead to form an aqueous slurry of precipitated pigment and applying porous silica and alumina to said precipitated pigment,
wherein the improvement comprises adding from 0.1 to 30% by weight of a soluble boron compound, calculated as $B_2O_3$, to said aqueous medium.

2. Process for preparing molybdate orange pigment according to claim 1 wherein said boron compound is a water-soluble inorganic oxygen-containing boron compound which forms boric acid upon contact with aqueous media.

3. Process for preparing molybdate orange pigment according to claim 2 wherein said boron compound is selected from the group consisting of boric oxide, boric acid and acidified alkali metal borates.

4. Process for preparing molybdate orange pigment according to claim 2 wherein said boron compound is added to said aqueous solution in an amount from 0.1 to 1% by weight.

5. Process for preparing molybdate orange pigment according to claim 4 wherein said boron compound is boric oxide.

6. Process for preparing molybdate orange pigment according to claim 4 wherein a coating of dense, amorphous silica is applied to said molybdate orange pigment.

7. Process for preparing molybdate orange pigment according to claim 2 wherein said boron compound is added to said aqueous slurry of precipitated pigment in an amount from 1 to 30% by weight.

8. Process for preparing molybdate orange pigment according to claim 7 wherein said boron compound is boric oxide.

9. Process for preparing molybdate orange pigment according to claim 7 wherein a coating of dense, amorphous silica is applied to said molybdate orange pigment.

10. Molybdate orange pigment prepared according to the process of claim 1.

11. Molybdate orange pigment prepared according to the process of claim 6.

12. Molybdate orange pigment prepared according to the process of claim 9.

13. Molybdate orange pigment containing porous silica and alumina and from 0.015% to 0.1% by weight of boron, calculated as $B_2O_3$.

14. Molybdate orange pigment according to claim 13 wherein the total amount of porous silica, calculated as $SiO_2$, and alumina, calculated as $Al_2O_3$, is from 0.5 to 3.0% by weight.

15. Molybdate orange pigment according to claim 14 having a coating of dense, amorphous silica in an amount from 2 to 40% by weight.

* * * * *